Figure 1:
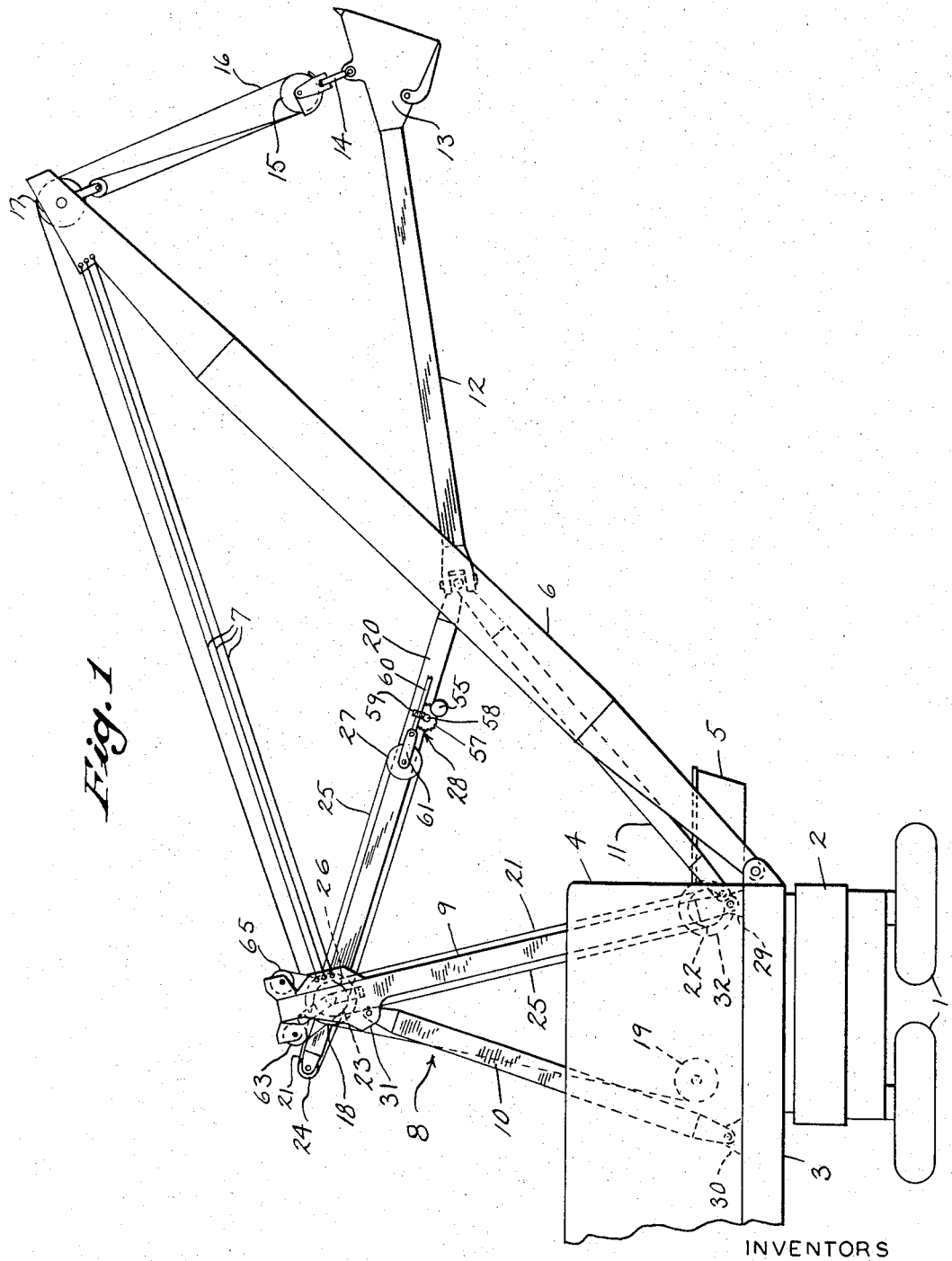

April 9, 1968

E. C. WILSON ET AL 3,376,983

ROPE CROWD FOR A KNEE ACTION SHOVEL

Filed Nov. 14, 1966

6 Sheets-Sheet 1

INVENTORS
ELLIS C. WILSON
ROBERT E. TALLEY

BY Thomas O. Klocher

ATTORNEY

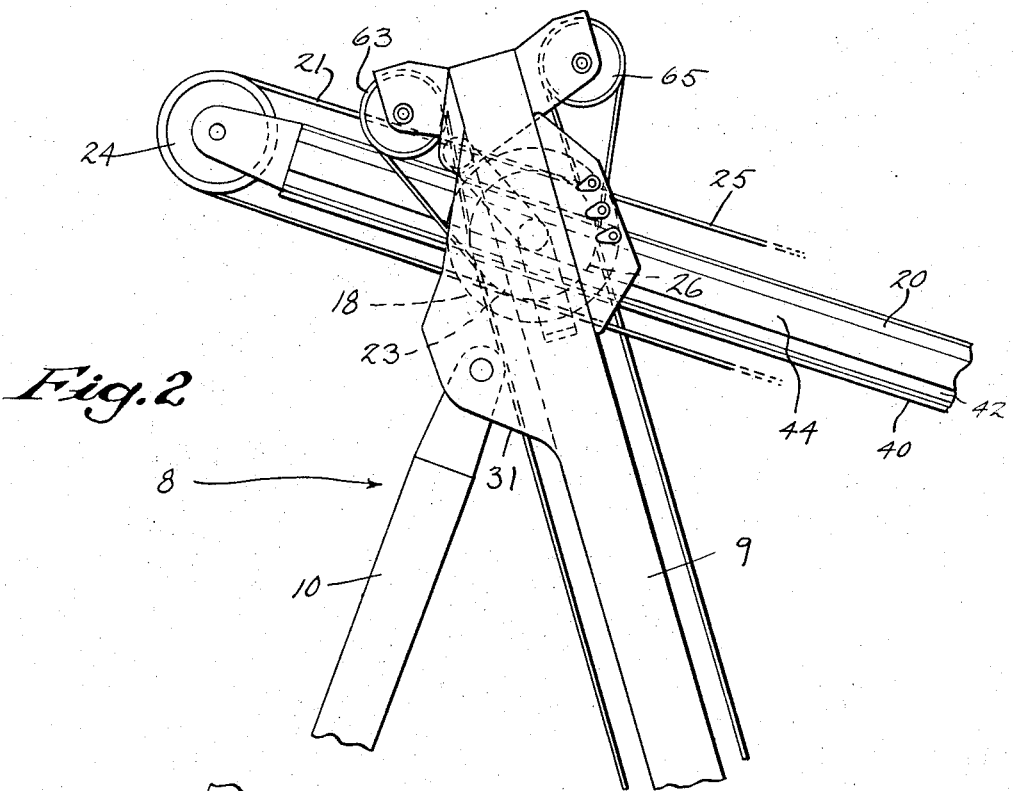
Fig. 2
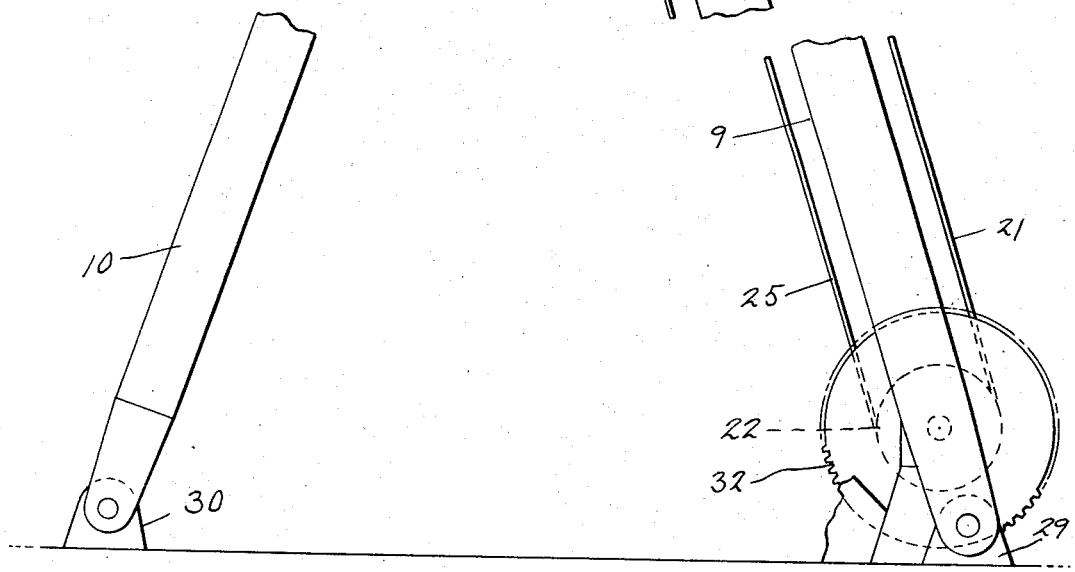
INVENTORS
ELLIS C. WILSON
ROBERT E. TALLEY
BY Thomas O. Kloehn
ATTORNEY

INVENTORS
ELLIS C. WILSON
ROBERT E. TALLEY

BY Thomas O. Kloehn

ATTORNEY

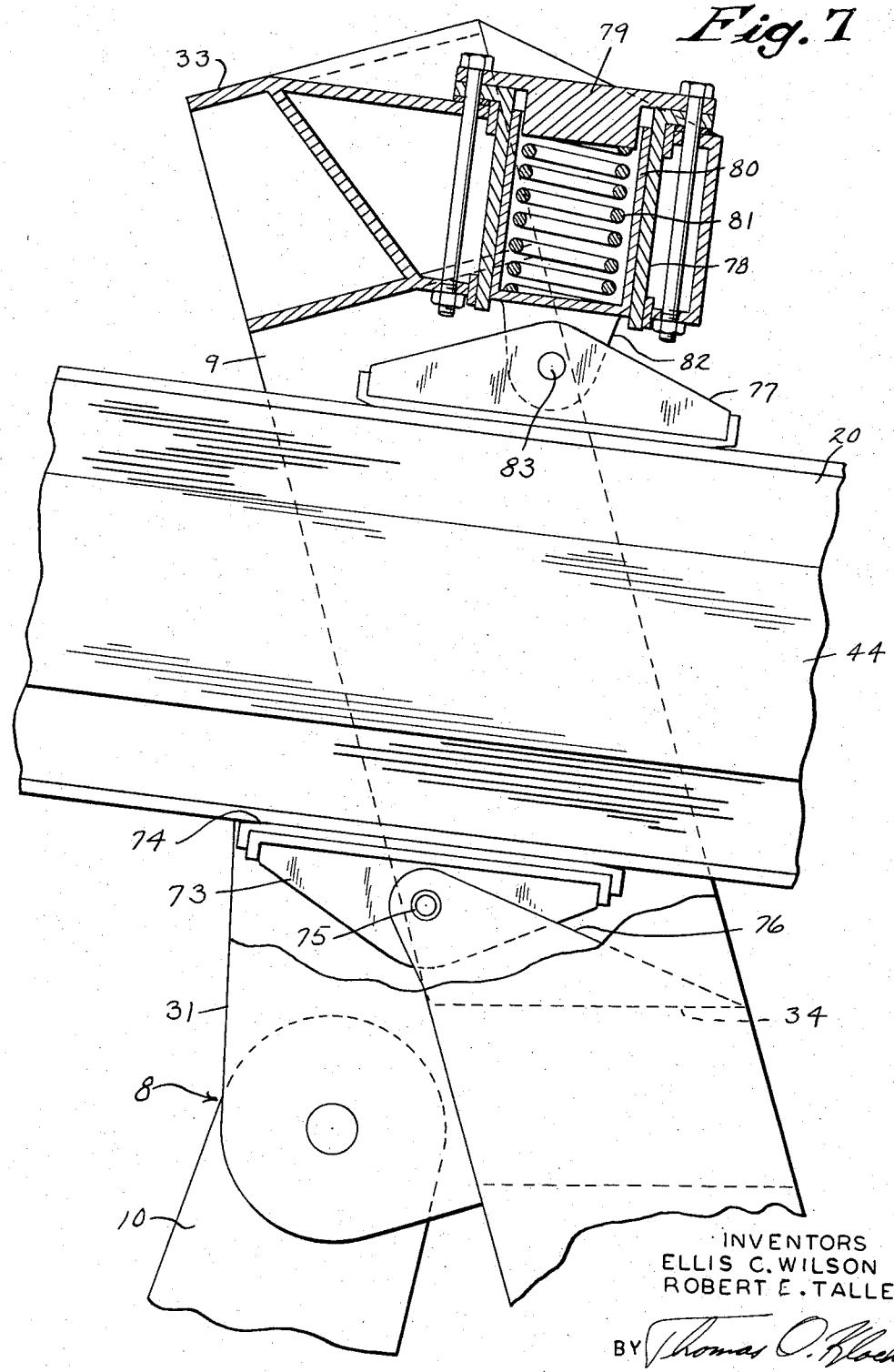

United States Patent Office 3,376,983
Patented Apr. 9, 1968

3,376,983
ROPE CROWD FOR A KNEE ACTION SHOVEL
Ellis C. Wilson, South Milwaukee, and Robert E. Talley, Racine, Wis., assignors to Bucyrus-Erie Company, South Milwaukee, Wis., a corporation of Delaware
Filed Nov. 14, 1966, Ser. No. 593,932
5 Claims. (Cl. 214—136)

The present invention relates to a crowd mechanism for a knee action power shovel; and more particularly, the invention resides in the combination of a rope crowd acting between a crowd handle and the top of an A-frame and a crowd handle support means in the top of said A-frame which supports the bottom of said crowd handle for a reciprocating movement and includes means laterally spaced from each side of said crowd handle to limit lateral movements of said crowd handle.

The present invention relates to the type of power shovel used mostly in strip mining. These shovels are of such size and capacities as to stagger the imagination, and this very size creates problems which are virtually unique to these machines. A recitation of some of the specifications of one stripping shovel in which the present invention is used will serve to illustrate the immensity of these machines. The revolving frame clears the ground by thirty-three feet and is supported on four dual crawlers with a tread of sixty-three and one-half feet, each crawler being six and one-half feet wide. The length of the mounting, which in autos is called the wheelbase, is seventy-nine feet. Each dual crawler is driven by a pair of two-hundred horsepower engines. The boom foot pin on top of the revolving frame is forty feet above ground, and the boom itself is one hundred seventy feet long. The dipper has a capacity of one hundred thirty cubic yards, a maximum dumping height of one hundred seventeen and one-half feet, and a maximum dumping radius of one hundred sixty-three feet. The weight of this stripping shovel is thirteen million seven hundred thousand pounds.

Prior to the present invention, when power shovels of this sort were of the knee action variety, the crowd mechanisms mounted on the A-frame have been of the rack and gear type to avoid the maintenance and upkeep expenses resulting from the two-month life of crowd cables, which had been experienced with different types of shovels where rope crowds were mounted on the boom to act directly on the dipper handle. However, the gear and rack crowd mechanism also has some severe, inherent problems. The vibration set up by a gear and rack crowd on a shovel of this size creates a loud noise that can be heard a mile away, and the entire A-frame is so violently shaken that personnel standing on the A-frame platform must hold onto a handrail. Such vibration after extensive use can produce fatigue failures in the rear legs of the A-frame, such that the rear legs will break off and the entire superstructure will fall forward, ripping out of the machine, with a resulting extensive damage to the machine and peril to personnel in the vicinity. Many users of such machines specify that a safety guy cable be installed between the top of the A-frame and the revolving frame behind the back legs of the A-frame. U.S. Patent No. 2,443,537 suggests the use of a rope drive in the A-frame and crowd handle of a knee action shovel, but this would function only in a relatively small machine since the friction between the drive rope and the drum would not be sufficient to drive the dipper of a stripping shovel, and in any event the frictional wear on the rope would be prohibitive.

The present invention overcomes all of the problems mentioned and secures many additional advantages by providing a rope crowd in the A-frame of the shovel. When the rope crowd is used, the saddle block required by a gear and rack crowd may be eliminated and the crowd handle can ride freely on rollers with slide bars spaced from its side to permit unrestrained, though limited, lateral motion and with no restraining force on its upper surface. Vibration and noise are eliminated with this crowd mechanism, and it is not necessary to machine the crowd handle as had been required to fit the close tolerances of a saddle block. The lateral movement allowed the crowd handle permits it to align itself with the stiff leg, thus minimizing torsion stresses and side loads in the crowd handle; and, since the crowd force is exerted on the center of the rearward end of the crowd handle, the eccentric loading experienced with gear and rack crowds is avoided. Hence, the crowd handle may be of a substantially lighter construction than had previously been used; and the substitution of approximately 20,000 pounds of crowd handle support mechanisms for the 100,000 to 500,000 pound saddle block has also substantially reduced the weight and cost, not only of the crowd handle support, but also of associated equipment on the machine. Also, it was discovered that by mounting the rope crowd in the A-frame, where it is relatively isolated from the sway of the dipper and dipper handle, the average crowd rope life is increased from two months to a year, making its maintenance and upkeep costs competitive with any other form of crowd.

Accordingly, the salient objects and advantages of the present invention may be summarized as follows:

To provide a quiet operating and vibration-free crowd mechanism for a knee action shovel;

To provide a light-weight crowd mechanism for a knee action power shovel;

To provide a relatively inexpensive and low maintenance cost crowd mechanism for a knee action type of shovel;

To increase the life of a knee action power shovel and particularly of the superstructure of such a knee action power shovel;

To eliminate the need for a saddle block in the crowd mechanism of a knee action power shovel;

To permit the use of lighter crowd handles in a knee action power shovel;

To obviate the need to machine crowd handles for knee action shovels;

To eliminate eccentric loading and torsion stress and side loading on the crowd handle of a knee action type of power shovel;

To minimize the shock loading on the crowd mechanism of a knee action power shovel; and To increase the crowd rope life of a rope crowd mechanism.

The following portion of this specification in conjunction with the attached drawings provides a written description of the invention and of the manner and process of making and using it in such clear, full, concise, and exact terms as to enable any person skilled in the art to which it pertains, or with which it is most nearly connected, to make and use the same. In addition, preferred embodiments of the invention are disclosed in detail in order to set forth the best modes contemplated by the inventors for carrying out this invention. However, the specific embodiments of the invention disclosed here do not represent, in any sense, the full scope of the invention. On the contrary, the invention may be employed in many different embodiments. Therefore, at the conclusion of the descriptive portion of this specification, the subject matter which is regarded as the invention is particularly pointed out and distinctly claimed in numbered claims.

Figure 3:
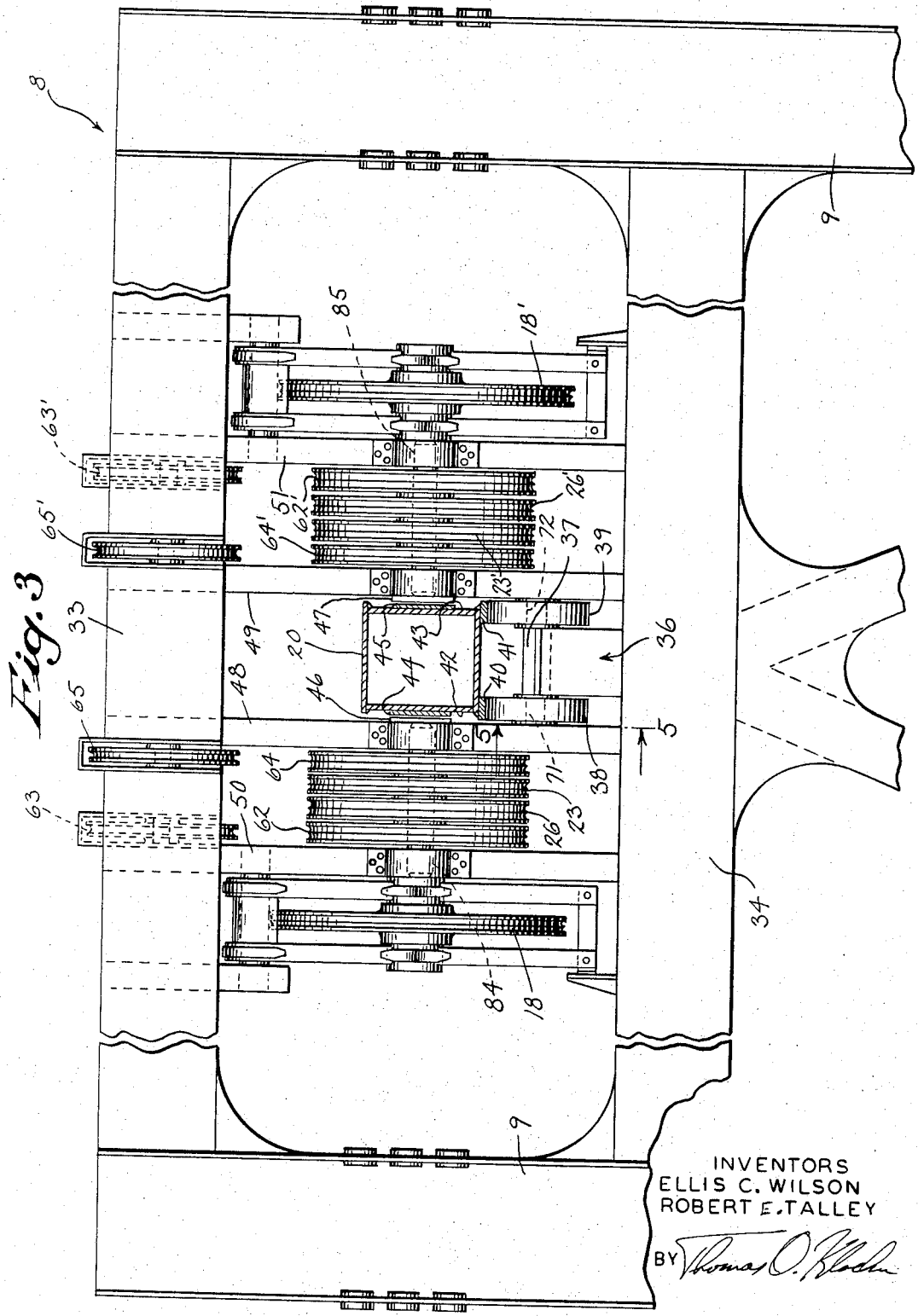
Figure 4:
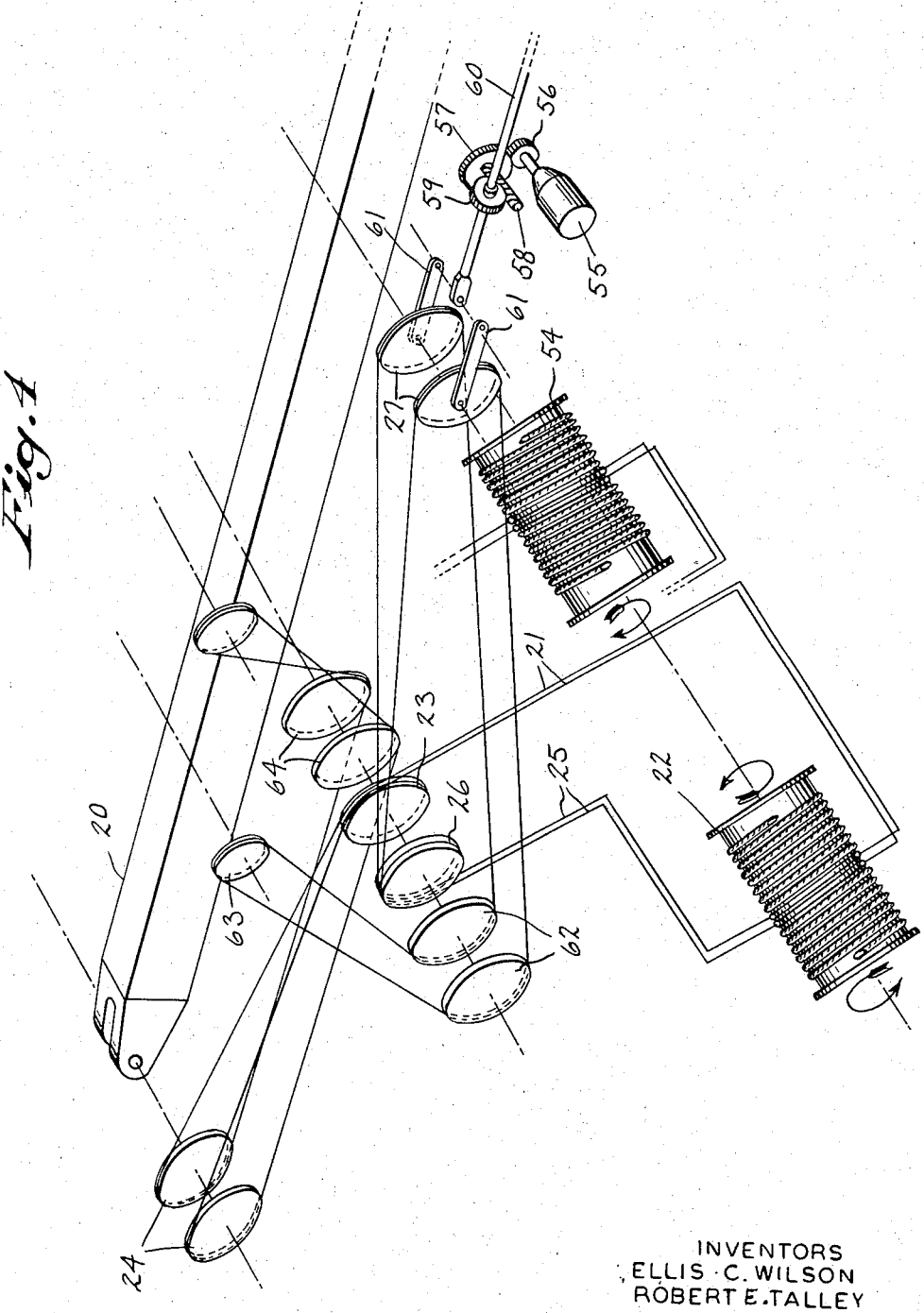
Figure 5:
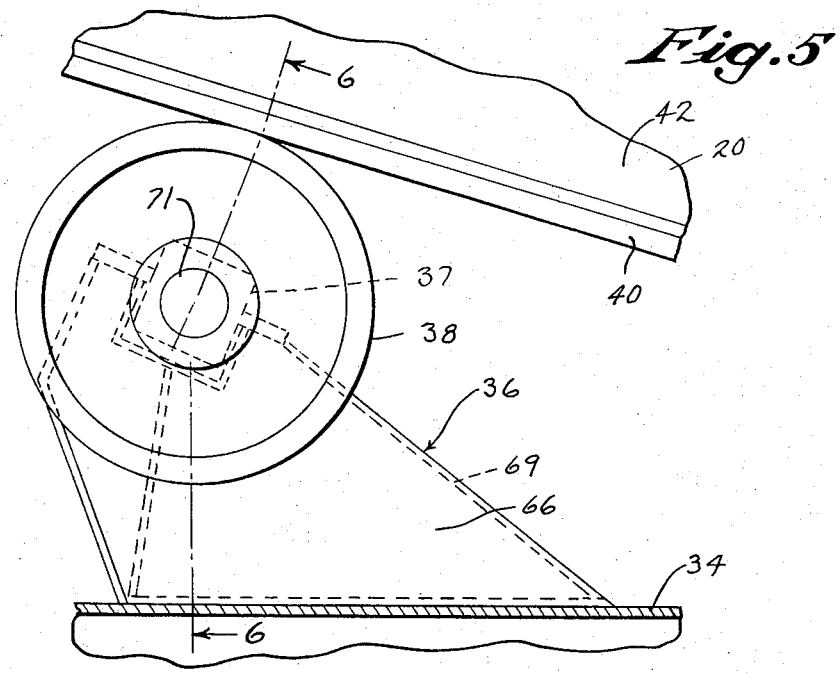
Figure 6:
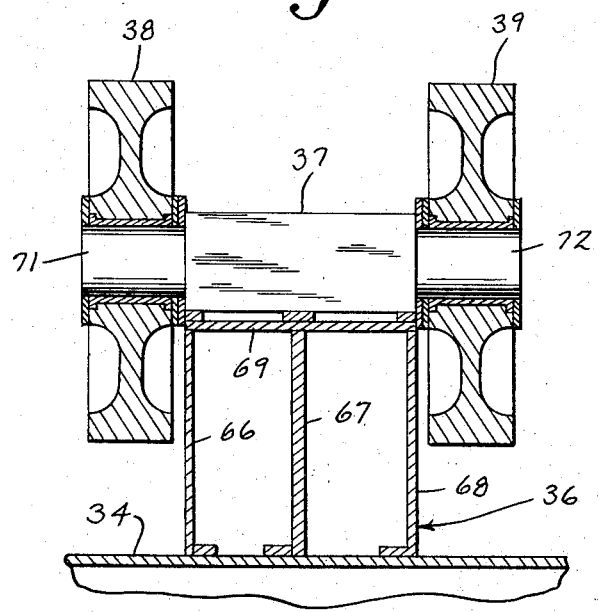

In the drawings:

FIG. 1 is a side elevation of a knee action shovel employing the present inventon, FIG. 2 is an enlarged side elevation of the A-frame, crowd mechanism, and a portion of the crowd handle shown in FIG. 1, FIG. 3 is a front elevation of the top of the A-frame shown in FIG. 2 illustrating the support of the crowd handle and the location of some of the crowd sheaves, FIG. 4 is a diagrammatic representation of the rope crowd mechanism for the right hand side of the dipper handle, FIG. 5 is an enlarged side elevation of crowd handle support rollers mounted in the top of the A-frame, FIG. 6 is a front view in section of the crowd handle support rollers shown in FIG. 5 taken along the line 6—6 in FIG. 5; and FIG. 7 is a side elevation of the top of the A-frame showing an alternative form of crowd handle support.

Referring now to the side elevation of a knee action shovel as shown in FIG. 1, two of four crawlers 1 which support the shovel may be seen mounting a base 2 that rotatably supports a revolving frame 3. The revolving frame 3 supports a large machine housing 4 and an operator's cab 5 which is cantilevered forwardly of the front end of the revolving frame 3.

The superstructure of the machine includes a boom 6 which is made up of a pair of boom elements mounted side by side which have their foot ends pivotally mounted on the front of the revolving frame 3 and their top ends supported on support cables 7 that are anchored in the top of an A-frame 8. The A-frame 8 is made up of a pair of front legs 9 and a pair of back legs 10 which have their bottom ends mounted on a revolving frame 3 behind the boom 6 so as to rest substantially over the center of the base 2. Since both the A-frame 8 and the boom 6 are made up of pairs of identical elements mounted side by side, only one of each element can be seen in a side elevation. A stiff leg 11 has one end pivotally mounted to the front end of the revolving frame 3 slightly behind and between the elements of the boom 6. A dipper handle 12, with a dipper 13 on its forward end, has its rearward end pivotally mounted on the top of the stiff leg 11 so that it may pivot laterally and vertically with respect to the stiff leg 11. In the commercial shovel mentioned above, the stiff leg 11 is sixty-four feet long and the effective length of the dipper handle 12 is one hundred two and one-half feet. A dipper bail 14 extends upwardly from the dipper 13 to padlock sheaves 15, around which twin double hoist cables 16 pass. The twin double hoist cables 16 have one end of the two part hitch dead ended around an equalizing sheave at the boom point 6 and pass around the padlock sheaves 15 over hoist sheaves 17 at the top of the boom 6 and hoist sheaves 18 at the top of the A-frame 8 down to hoist drums 19 mounted beneath the A-frame 8 on the revolving frame 3. Since the hoist cables 16 are twin double ropes extending side by side, only one is shown in a side elevation; and, accordingly, the sheaves 17 and 18 and the hoist drum 19 are really pairs of double grooved sheaves 17 and 18 and hoist drums 19. In the commercial shovel mentioned in the beginning of this specification, the hoist cables 16 are two and five-eighths inch steel cables and the hoist drums 19 are driven by eight one-thousand horsepower motors (not shown).

To impart a crowd action to the dipper handle 12 and the dipper 13, a crowd handle 20 is employed and it has its forward end pivotally fastened to the top of the stiff leg 11 and the rearward end of the dipper handle 12, and its rearward end pivotally and reciprocably supported in the top of the A-frame 8. Crowd ropes 21 extend from a drum 22 mounted on the revolving frame 3 upward adjacent to the front leg 9 of the A-frame 8 to a crowd sheave 23 in the top of the A-frame 8 and then rearwardly about a traveling crowd sheave 24 on a rearward end of a crowd handle 20. Retract rope 25 also extends from the drum 22 on a revolving frame 3 upward parallel to the front leg 9 of the A-frame 8 to retract sheave 26 in the top of the A-frame 8, and from there forwardly to a traveling retract sheave 27 mounted toward the forward end of the crowd handle 20. A retract take-up mechanism 28 is connected to the traveling retract sheave 27 to maintain tension in the retract rope 25. In the mentioned commercial shovel, the crowd and retract ropes 21 and 25 are also two and five-eighths inch steel cables.

The structure of the A-frame 8 appears in greater detail in the enlarged view shown in FIG. 2. There it can be seen that the front legs 9 and the back legs 10 are pin mounted front and rear on brackets 29 and 30, respectively, on the top of the revolving frame 3. The front leg 9 projects above the top of the back leg 10 and directly supports the crowd tackle and the crowd handle 20. The tops of the rear legs 10 of the A-frame 8 are pinned to brackets 31 projecting from the back of the front legs 9 to support the front legs 9. Between the brackets 29 for the front legs 9, a gear 32 for driving the drum 22 can be seen mounted on the revolving frame 3. The gear 32 is driven by conventional, well known power apparatus.

Viewing the top of the A-frame 8 from the front, as in FIG. 3, the two front legs 9 can be seen joined by a top beam 33 and a lower beam 34 with sway braces 35 projecting downwardly from the middle of the lower beam 34. A pedestal 36 is mounted on the center of the lower beam 34 and supports an axle 37 with rollers 38 and 39 rotatably mounted on each end. The crowd handle 20, shown in section in FIG. 3, has a pair of tracks 40 and 41 welded on its bottom surface, which ride on the rollers 38 and 39, respectively. As can be seen in the drawing, the crowd handle 20 is a square tube; and on its lateral surfaces 42 and 43 it has slide plates 44 and 45, respectively, which are spaced from slide plates 46 and 47 which are mounted on struts 48 and 49 which extend between the top beam 33 and the lower beam 34 on the left and right sides of the crowd handle 20 as seen in the drawing. Adjacent to and spaced from the strut 48 on the left hand side of the crowd handle 20 is another strut 50; and on the right hand side of the crowd handle, still another strut 51, spaced from and parallel to the strut 49, spans the beams 33 and 34. It will be noted that, on either side of the crowd handle 20, identical arrangements of sheaves are mounted between the struts 48, 50 and 49, 51, respectively; but the significance of these sheaves is better understood in light of the diagram shown in FIG. 4.

FIG. 4 is a diagram of the tackle for the rope crowd mechanism for the machine operator's right hand side of the crowd handle 20. For clarity in the drawing, the identical tackle on the left hand side of the crowd handle 20 is not shown, but it is to be understood that the tackle shown on the right hand side of the crowd handle is duplicated on the opposite side. Both the crowd rope 21 and the retract rope 25 are wound on the drum 22 on the right hand side, but in opposite directions. Similarly, the corresponding retract and crowd ropes 52 and 53, respectively, are wound in opposite directions on a second drum 54 for the left hand side. The conventional power drive means for the two drums 22 and 54 are not shown, since they are well known to the art. When the drums 22 and 54 are rotated in one direction, the crowd ropes 21 and 52 are reeled in and the retract ropes 25 and 53 are reeled out. The opposite would be true if the drums 22 and 54 are rotated in opposite direction. The retract rope 25 for the right hand side is strung from the top of the drum 22 about a double retract sheave 26 which is anchored in the top of the A-frame, about a pair of traveling retract sheaves 27, which are anchored to a retract take-up mechanism 28 toward the front end of the crowd handle 20, about a pair of fixed retract sheaves 62 in the A-frame, and about a dead end retract sheave 63 mounted above the crowd handle 20. The retract take-up mechanism 28 is made up of a motor 55 with a pinion 56 on its drive shaft to drive a gear 57, which in turn drives a screw 58 to rotate a pinion 59 which is rotatably mounted on a screw 60. The screw 60 is pinned to a pair of links 61 which are pinned to the traveling retract sheave 27. Since the motor 55, pinion 56, gear 57, screw 58 and pinion 59 are all anchored to the crowd handle 20, the traveling retract sheaves 27 are likewise anchored to the crowd handle 20 and are adjustable to the motor 55 to take up slack in the retract rope 25 or to let out retract rope 25.

Similarly, the crowd rope 21 shown coming off the bottom of the drum 22 is strung about a double crowd sheave 23 mounted in the top of the A-frame 8, a pair of traveling crowd sheaves 24 mounted on the back of the crowd handle 20, a pair of fixed crowd sheaves 64 mounted in the top of the A-frame and about a dead-end crowd sheave 65 mounted above the crowd handle 20. In short, the rope crowd mechanism is made up of two block and tackle arrangements: a retract block and tackle which has its anchored sheaves 26 and 62 and dead-end sheave 63 mounted in the top of the A-frame, and its movable sheaves 27 mounted toward the front end of the crowd handle 20; and a crowd block and tackle which has its fixed sheaves 23 and 64 and dead-end sheave 65 mounted in the top of the A-frame, and its traveling sheaves 24 mounted at the rearward end of the crowd handle 20. By shortening the retract block and tackle arrangement, the dipper handle is retracted; and by shortening the crowd block and tackle arrangement, the dipper is crowded forwardly. Since both the crowd rope 21 and the retract rope 25 are wound on the same drum, when one of these block and tackles is contracted, the other will be permitted to expand.

Turning back to FIG. 3, it will be seen that the fixed or anchored sheaves 26, 62 and 23, 64, with the counterpart sheaves 26', 62' and 23', 64' on the operator's left side, are concentrically mounted in the top of the A-frame 8 on shafts 84 and 85 that are supported by the struts 48, 50 and 49, 51, respectively. Concentric with those fixed sheaves, 26, 26', 62, 62', 23, 23', and 64, 64', and outside of them are mounted the hoist sheaves 18 and 18', respectively. The dead end sheaves 63 and 65, 63' and 65', respectively, are mounted on the top beam 33, fore and aft of the top of the front leg 9 of the A-frame 8.

FIGS. 5 and 6 show the preferred mounting for the crowd handle 20 in the top of the A-frame 8. A portion of the lower beam 34 in the top of the A-frame 8 is illustrated, with the pedestal 36 mounted on it. The pedestal 36 is made up of three vertical plates 66, 67 and 68 with a top plate 69 spanning them; and these are welded to the top of the lower beam 34. A square notch 70 is formed across the top of the pedestal 36, and the axle 37 is mounted in it. The ends 71 and 72 of the axle 37 are round, and rollers 38 and 39 are rotatably mounted on the ends 71 and 72 of the axle 37. The crowd handle 20 then rides on the rollers 38 and 39, having tracks 40 and 41 welded to its bottom surface to meet the rollers 38 and 39. Convenient lubricating channels (not shown) may be built inside of the axle 37 to provide constant lubrication between the axle ends 71 and 72 and the hubs of the rollers 38 and 39 rotating about them.

FIG. 7 illustrates an alternative support means for the crowd handle 20, and it shows a shoe 73 with a flat top surface 74 pivotally mounted about a pin 75 through a pedestal 76 which projects upwardly from the top of the lower beam 34 spanning the top of the front legs 9 of the A-frame 8. As an additional option with this embodiment, a second shoe 77 is pivotally suspended from a resilient mounting means in the bottom of the top beam 33 to ride on the top of the crowd handle 20. A sleeve 78 is formed in the top beam 33 with a spring seat 79 bolted across its top. A hollow shank 80 containing a spring 81 is slidably mounted in the sleeve 78 so that the spring 81 bears against the spring seat 79. An eye 82 projects forward from the hollow shank 80 to receive a pin 83 from which the top shoe 77 is pivotally suspended. This alternative embodiment clearly presents higher friction than the preferred embodiment, and the problem is magnified by difficulty in achieving adequate lubrication. Nevertheless, it will have appropriate applications.

The operation of the rope crowd has been fully described; and it will be apparent that, when the crowd handle 20 is being crowded or retracted, it will ride freely on the rollers 38 and 39 in the preferred embodiment, or between the shoes 73 and 77 in the alternative embodiment, and the slide plates 44 and 46, 45 and 47 need never touch. However, it is contemplated that the crowd handle 20 will move laterally during either the crowd, or retract movement, or both, in order to align itself with the stiff leg 11; and in that event, the slide plates 46 and 47 on the vertical struts 48 and 49 will serve to limit the extent of that lateral movement. Also, in the preferred embodiment the crowd handle 20 is completely unrestrained on its top surface; and in the alternative embodiment, it is also unrestrained, though it is resiliently urged downward, since it is capable of upward movement. In either case, friction between the moving crowd handle 20 and its supporting structure is reduced to an absolute minimum; and the crowd handle 20 is given the greatest of freedom to adjust itself to such force as may be transmitted from the dipper handle 12. Since the crowd handle 20 is thus free to move, it need not be made of the weight and strength required to withstand severe torsion stresses and side loadings, such as are experienced when the crowd handle must fit closely in a rigid saddle block. Therefore, the crowd handle 20 may be of lighter construction than had previously been used in such shovels. Similarly, since the traveling crowd sheaves 24 are centrally mounted on the rear of the crowd handle 20, there is no eccentric loading of the crowd handle 20 as would be the case if there were a rack and gear crowd, which tends to load one side or the other depending upon the forces exerted on the handle 20 by the dipper handle 12, further reducing the strength and weight requirements of the crowd handle 20. Since the crowd handle 20 is free to move in its supporting structure, the warping that is bound to occur in such a long beam may be tolerated, and the crowd handle 20 need not be machined, as would be required if it were to slide through a saddle block. Finally, since only cables and sheaves are mounted on the top of the A-frame, the weight in the superstructure is drastically reduced and the heavy power equipment is mounted down on the revolving frame 3 inside of the machinery housing 4 where it is adequately sheltered from the elements.

When the crowd mechanism of the present invention is operating, the crowd handle 20 rides quietly on its rollers 38 and 39 without transmitting noticeable vibrations to the A-frame 8. The inevitable shock experienced by the equipment is transmitted from the dipper 13 through the dipper handle 12 through the stiff leg 11 and the crowd handle 20 is readily absorbed in the crowd rope 21 and retract rope 25 because, although they are heavy steel cables, they are inherently resilient. Thus, the four to one shock factor for which a rack and gear crowd must be designed is reduced by the crowd mechanism of the present invention.

The present invention may be employed in many variations of the embodiment shown here, as will be readily appreciated by those skilled in the art. Therefore, the foregoing description is not to be taken as definitive of the scope of the invention, but rather that which is regarded as the invention is set forth in the following claims.

We claim:

1. In a knee action power shovel of the type having a revolving frame with a boom mounted on its front end and an A-frame mounted on it behind said boom with boom support cable supporting the top of said boom from said A-frame; and having a stiff leg pivotally mounted on the front end of said revolving frame, a dipper handle with a dipper on its forward end and its rearward end pivotally mounted on the top of said stiff leg, and a crowd handle with one end pivotally connected to the top of said stiff leg and its other end supported in a crowd mechanism in the top of said A-frame to impart crowd movement to said crowd handle, a crowd mechanism comprising the combination of a support and guide for said crowd handle mounted in the top of said A-frame and including means for reciprocally supporting the bottom of said crowd handle, means laterally spaced from each side of said crowd handle to limit lateral movement of said crowd handle, and said crowd handle being unrestrained on its top;

and a rope crowd having a crowd cable and a retract cable extending from at least one power driven drum mounted on said revolving frame to crowd sheaves and retract sheaves mounted both in the top of said A-frame and on said crowd handle.

2. A crowd mechanism asset forth in claim 1 wherein said means for supporting the bottom of said crowd handle comprise at least one roller rotatably mounted in the top of said A-frame.

3. A crowd mechanism as set forth in claim 1 wherein said means for supporting the bottom of said crowd handle comprises a shoe slidably supporting said crowd handle and pivotally mounted in the top of said A-frame.

4. A crowd mechanism as set forth in claim 3 wherein a second shoe pivotally mounted in the top of said A-frame resiliently bears against the top of said crowd handle.

5. A crowd mechanism as set forth in claim 1 wherein a crowd cable having its ends fastened on a power driven drum mounted on said revolving frame extends to a block and tackle arrangement which acts against the top of said A-frame and the rearward end of said crowd handle;

and a retract cable having its ends fastened on a power drive drum mounted on said revolving frame extends to a second block and tackle arrangement which acts against the top of said A-frame and the forward portion of said crowd handle.

No references cited.

HUGO O. SCHULZ, *Primary Examiner.*